United States Patent
Zhamu et al.

(10) Patent No.: US 11,949,083 B2
(45) Date of Patent: Apr. 2, 2024

(54) BATTERY MODULE OR PACK WITH A DISTRIBUTED COOLING AND FIRE PROTECTION SYSTEM AND METHOD OF OPERATING SAME

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 37 days.

(21) Appl. No.: 16/899,026

(22) Filed: Jun. 11, 2020

(65) Prior Publication Data
US 2021/0391611 A1  Dec. 16, 2021

(51) Int. Cl.
*H01M 10/6567* (2014.01)
*H01M 10/0525* (2010.01)
(Continued)

(52) U.S. Cl.
CPC ... *H01M 10/6567* (2015.04); *H01M 10/6556* (2015.04); *H01M 50/20* (2021.01); *H01M 10/0525* (2013.01); *H01M 10/054* (2013.01); *H01M 10/06* (2013.01); *H01M 10/3909* (2013.01)

(58) Field of Classification Search
CPC ......... H01M 10/6567; H01M 10/6556; H01M 10/0525; H01M 10/054; H01M 10/06; H01M 10/3909; H01M 50/20
See application file for complete search history.

(56) References Cited

U.S. PATENT DOCUMENTS

| 7,071,258 B1 | 7/2006 | Jang et al. |
| 9,590,282 B2 | 3/2017 | Kossakovski et al. |

(Continued)

FOREIGN PATENT DOCUMENTS

| CN | 206116564 U | 4/2017 |
| CN | 210430029 U | 4/2020 |
| WO | 2005019132 A1 | 3/2005 |

OTHER PUBLICATIONS

Chen et al., "Three-dimensional Flexible and Conductive Interconnected Graphene Networks Grown by Chemical Vapor Deposition" Nature Materials (2011) vol. 10, pp. 424-428.
(Continued)

*Primary Examiner* — Karie O'Neill Apicella

(57) ABSTRACT

Provided is a battery assembly having a distributed cooling and fire protection system, the battery assembly comprising: (a) a plurality of battery cells; (b) a case configured to hold the plurality of battery cells; and (c) a cooling liquid distribution system, having a cooling liquid reservoir and/or pipes that are in proximity to at least a subset of the plurality of the cells and configured to deliver, on demand, a desired amount of the first cooling liquid on a cell or multiple cells in the vicinity of the cell when a temperature of the cell exceeds a threshold temperature; wherein the first cooling liquid comprises a fire protection or fire suppression substance which, on contact with the cell, prevents, retards, or extinguishes a cell fire and prevents a propagation or cell-to-cell cascading reactions of a thermal runaway or fire event.

14 Claims, 8 Drawing Sheets

(51) Int. Cl.
  *H01M 10/054* (2010.01)
  *H01M 10/06* (2006.01)
  *H01M 10/39* (2006.01)
  *H01M 10/6556* (2014.01)
  *H01M 50/20* (2021.01)

(56) References Cited

U.S. PATENT DOCUMENTS

| | | | |
|---|---|---|---|
| 9,835,390 | B2 | 12/2017 | Zhamu et al. |
| 9,959,948 | B2 | 5/2018 | Zhamu et al. |
| 11,283,068 | B2 | 3/2022 | Perera et al. |
| 11,374,252 | B2 | 6/2022 | Endo |
| 11,404,717 | B2 | 8/2022 | Fauteux et al. |
| 2004/0226726 | A1* | 11/2004 | Holland ............... A62C 3/07 169/62 |
| 2008/0277628 | A1 | 11/2008 | Zhamu et al. |
| 2010/0136391 | A1* | 6/2010 | Prilutsky ........... H01M 10/6567 429/62 |
| 2013/0108897 | A1 | 5/2013 | Christian et al. |
| 2013/0136966 | A1* | 5/2013 | Bhardwaj ............ H01M 50/20 429/94 |
| 2013/0295430 | A1 | 11/2013 | Kurahashi |
| 2015/0028070 | A1 | 1/2015 | Lambert et al. |
| 2015/0303531 | A1 | 10/2015 | Willgert et al. |
| 2015/0303535 | A1 | 10/2015 | White et al. |
| 2016/0019995 | A1 | 1/2016 | Zhamu et al. |
| 2016/0136468 | A1* | 5/2016 | Kosovski-Shahor .. A62C 13/64 169/46 |
| 2017/0018750 | A1* | 1/2017 | Wintner ............. H01M 10/653 |
| 2017/0062884 | A1 | 3/2017 | Frutschy et al. |
| 2017/0162291 | A1 | 6/2017 | Zhamu et al. |
| 2017/0182474 | A1 | 6/2017 | Zhamu et al. |
| 2017/0221767 | A1 | 8/2017 | Posseme et al. |
| 2018/0016481 | A1 | 1/2018 | Terada et al. |
| 2018/0037458 | A1 | 2/2018 | Zhamu et al. |
| 2018/0191038 | A1* | 7/2018 | Li ....................... H01M 10/625 |
| 2018/0233791 | A1* | 8/2018 | Tong ................... H01M 10/625 |
| 2018/0248238 | A1 | 8/2018 | Pinon |
| 2019/0301814 | A1 | 10/2019 | Lin et al. |
| 2021/0028507 | A1 | 1/2021 | Su et al. |
| 2021/0028509 | A1 | 1/2021 | Su et al. |
| 2021/0296716 | A1 | 9/2021 | Zhamu et al. |
| 2021/0305639 | A1 | 9/2021 | Zhamu et al. |
| 2021/0313634 | A1 | 10/2021 | Zhamu et al. |
| 2021/0376409 | A1 | 12/2021 | Zhamu et al. |
| 2022/0153139 | A1 | 5/2022 | Singhal et al. |
| 2022/0199994 | A1 | 6/2022 | El-Kady et al. |
| 2022/0246363 | A1 | 8/2022 | Losic et al. |

OTHER PUBLICATIONS

Choi et al., "3D Macroporous Graphene Frameworks for Supercapacitors with High Energy and Power Densities" ACS Nano (2012) vol. 6, pp. 4020-4028.

Jang et al., "Processing of Nano Graphene Platelets (NGPs) and NGP Nanocomposites: A Review" J. Materials Sci. (2008) vol. 43, pp. 5092-5101.

Xu et al., "Self-Assembled Graphene Hydrogel via a One-Step Hydrothermal Process" ACS Nano (2010) vol. 4, No. 7, pp. 4324-4330.

U.S. Appl. No. 16/827,067; Non-Final Office Action dated Jul. 13, 2022; 45 pages.

U.S. Appl. No. 16/827,067; Final Office Action dated Jan. 10, 2023; 33 pages.

U.S. Appl. No. 16/833,616; Final Office Action dated Oct. 21, 2022; 14 pages.

U.S. Appl. No. 16/837,569; Non-Final Office Action dated Apr. 27, 2023; 59 pages.

U.S. Appl. No. 16/837,569; Non-Final Office Action dated Aug. 22, 2022; 28 pages.

U.S. Appl. No. 16/883,949; Final Office Action dated May 10, 2023; 37 pages.

Wen, Chih-Yung; et al.; "Application of a thermally conductive pyrolytic graphite sheet to thermal management of PEM fuel cell," Dec. 2007, Elsevier, p. 133_Abstract Only.

* cited by examiner

BATTERY MODULE OR PACK WITH A DISTRIBUTED COOLING AND FIRE PROTECTION SYSTEM AND METHOD OF OPERATING SAME

The present disclosure relates generally to the field of batteries and, in particular, to the cooling and fire protection systems for rechargeable batteries, such as lithium-ion and lithium metal batteries.

BACKGROUND

Electric vehicles (EVs) are viewed as a promising solution to $CO_2$ emission and climate change issues. Batteries have been at the heart of the rapidly emerging EV industry. The service life, capacity, and internal resistance of various types of rechargeable batteries, particularly the lithium-ion battery, are sensitive to temperature changes.

One major problem is the danger of overheating, allowing a large amount of current to reach a location in an extremely short period of time, creating local hot spots that can significantly degrade or damage the various component materials (anode, cathode, separator, and electrolyte, etc.) of a battery cell. Under extreme conditions, the local heat may cause the liquid electrolyte of a battery to catch fire, leading to fire and explosion hazards. Battery life may be reduced by ⅔ in hot climates during aggressive driving and without cooling. With a battery temperature exceeding the stable point, severe exothermic reactions can occur uncontrollably. In addition, if a lithium-ion battery approaches thermal runaway, only 12% of the total heat released in the battery is enough to trigger thermal runaway in adjacent battery cells. This is the biggest risk during the use of lithium-ion batteries. In order not to compromise the service life of a battery, it is important to design a battery module with good heat dissipation performance.

More commonly used battery thermal management methods include air cooling, liquid cooling, and phase change material (PCM) cooling, Air cooling can meet the thermal management requirements of the vehicles under some ordinary conditions. However, when the EV accelerates or operates at a high velocity, the battery is discharged at a high rate, generating heat at a fast pace. Under these conditions, conventional air cooling is unable to meet the cooling requirements for electric vehicles.

Phase change material (PCM) cooling system controls the temperature of the battery module by the heat absorption and heat release when the material undergoes phase changes. Power battery cooling experiments using PCM are easier to meet the needs of the lithium battery cooling system, but the high costs have prevented more widespread use of PCMs in electric vehicles.

The liquid cooling system can exhibit higher cooling efficiency and reliability. The liquid cooling system requires good sealing and fluid pumping accessories. The cooling performance of lithium-ion pouch or prismatic cells may be improved with cold plates implemented along both surfaces of a cell and by changing the inlet coolant mass flow rates and the inlet coolant temperatures. The enhanced cooling energy efficiency can be achieved with a low inlet coolant temperature, low inlet coolant mass flow rate, and a high number of the cooling channels.

Numerous methods have been proposed to improve the cooling performance. For air or liquid cooling, for example, increasing the coolant velocity or the size of cooling structure may benefit the average temperature and temperature uniformity. However, such improvements increase the pack volume and weight, resulting in a larger power consumption of the battery thermal management system (BTMS).

Overheating or thermal runaway of a battery, leading to the battery catching fire or battery explosion, has been a serious barrier against the acceptance of battery-driven EVs. There has been no effective approach to overcoming this battery safety problem without adding significant weight, volume, and complexity of the thermal management system. An urgent need exists for a battery system that can be operated in a safe mode free from any thermal runaway problem.

SUMMARY

An object of the present disclosure is to provide a cooling and fire protection system that enables the battery module/pack to operate in a safe mode with reduced or eliminated chance of overheating and without significantly increasing cooling system weight, volume, and complexity. Another object of this system is to have an ability to suppress thermal runaway or fire in a battery cell immediately upon initiation so as to avoid a cell-to-cell propagation of the thermal runaway or fire to other cells in the vicinity. Yet another object of the disclosure is to provide a method of operating such a cooling and fire protection system and apparatus.

It may be noted that the word "electrode" herein refers to either an anode (negative electrode) or a cathode (positive electrode) of a battery. These definitions are also commonly accepted in the art of batteries or electrochemistry.

In battery industry, a module comprises a plurality of battery cells packaged together. A pack comprises a plurality of modules aggregated together. The presently disclosed distributed cooling and fire protection system can be used to cool and protect one or a plurality of battery cells, regardless if or not they are packed into a module or pack or simply some individual battery cells assembled together. The term "battery assembly" herein refers to a module, several modules, a pack, several packs, or simply a group of multiple cells assembled together. The term "battery" can refer to a battery cell or several battery cells connected together.

The battery in the disclosure may be a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor.

The present disclosure provides a battery assembly having a distributed cooling and fire protection system, the battery assembly comprising: (a) plurality of battery cells; (b) a case (or enclosure) configured to hold the plurality of battery cells, having an empty space around each cell to accommodate a desired amount of a first cooling liquid; and (c) a cooling liquid distribution system, having a cooling liquid reservoir and/or pipes (conduits) that are in proximity to at least a subset of the plurality of the cells and configured to deliver, on demand, the desired amount of the cooling liquid on (to be in contact with) a cell or multiple cells in the vicinity of the cell or into the empty space surrounding the cell when a temperature of the cell exceeds a threshold temperature; wherein the first cooling liquid comprises a fire protection or fire suppression substance which, on contact with the cell, prevents, retards, or extinguishes a cell fire and prevents a propagation or cell-to-cell cascading reactions of a thermal runaway or fire event.

In some embodiments, at least one of the battery cells (preferably each and every of the battery cells) comprises at least one heat spreader element disposed partially or entirely inside a protective housing of the cell, wherein the heat spreader element is in thermal communication with the pipes or reservoir and is configured to transport heat away from the battery cells through the heat spreader element to the pipes to activate the delivery of the desired amount of the first cooling liquid via a heat-induced breach (or breakage) or opening of a valve in the pipes.

The heat spreader element preferably comprises a high thermal conductivity material having a thermal conductivity at least 10 W/mK, more preferably at least 100 W/mK, further more preferably at least 500 W/mK, still more preferably at least 1,000 W/mK, and most preferably at least 1,500 W/mK. Such a high thermal conductivity enables the rapid transfer of the high heat from the interior of a battery cell (in case of an internal thermal runaway or fire event), through the heat spreader, to quickly reach a breach point (to generate a breach or breakage) of the pipes/reservoir or a valve-activating point (to open a valve) that allows the cooling liquid to flow out of the pipes and on or around the cells to quench the cells or prevent propagation of the thermal runaway or fire into other cells in the assembly.

In certain embodiments, the heat-induced breach comprises melting of a breach point in the pipes/reservoir at a temperature corresponding to (but lower than) the threshold temperature inside the cell. The massive heat generated inside a cell during a thermal runaway event spreads rapidly through the heat spreader element to reach a breach point where, for instance, the heat can induce melting of a material at a preset spot in the pipe or reservoir, enabling the first cooling liquid to flow out of the pipes/reservoir.

In certain embodiments, the opening of a valve in the pipes comprises operating a temperature-activated switch or a temperature actuated valve.

In certain preferred embodiments of the disclosed battery assembly, at least a heat spreader element or a portion of a heat spreader element is in thermal or physical contact with the first cooling liquid which acts to dissipate heat transferred from the battery cell during a normal cell operation. The cooling liquid is preferably in fluid communication with an external cooling device selected from a heat sink, a heat pipe, a vapor chamber, a stream of flowing fluid, a thermoelectric device, a heat exchanger, a radiator, or a combination thereof.

Preferably, the fire protection or fire suppression substance comprises a fluorinated organic compound. In certain embodiments, the fluorinated organic compound is selected from the group consisting of hydrochlorofluorocarbons, hydrofluorocarbons, perfluorocarbons, perfluorinated amines, partially fluorinated ethers, hydrofluoroethers, hydrofluoroolefins, fluorinated ketones, and combinations thereof. In certain embodiments, the fluorinated organic compound is selected from those having a boiling point from 50 to 200° C., preferably from 65 to 150° C.

In some embodiments, the fire suppression substance is selected from a fluorinated ketone $C_nF_{2n}O$ (6<n<20), heptafluoropropane, trichloromethane, hydrofluoroether, trimethyl phosphate, tripropyl phosphate, or a combination thereof.

In certain embodiments, the cooling liquid comprises a dielectric liquid having the fire protection or fire suppression substance dissolved or dispersed in the dielectric liquid. The dielectric liquid may contain silicone oil, transformer oil, fluorinated hydrocarbon, or any oil having a flash point higher than 150° C. (preferably >200° C.). Any oil (derived from petroleum, coal, or vegetable) that has a chemical formula $C_nX_{2n}Y_m$ (where n=8-20; X=H or a halogen element; Y=O, N, or S; m=1-10) tends to have a high flash point.

The fire protection or fire suppression substance may comprise a flame retardant agent. The fire protection or fire suppression substance may comprise ABC dry chemicals designed for extinguishing class A, class B, and/or class C fires. It may be noted that monoammonium phosphate, ABC Dry Chemical, ABE Powder, tri-class, or multi-purpose dry chemical is a dry chemical extinguishing agent used on class A, class B, and class C fires. In this classification system, A for "Ash" (referring to ordinary solid combustibles), B for "Barrel" (Flammable liquids and gases), and C for "Current" (energized electrical equipment). It uses a specially fluidized and siliconized monoammonium phosphate powder. ABC dry chemical is usually a mix of monoammonium phosphate and ammonium sulfate, the former being the active one. The mix between the two agents is usually 40-60%, 60-40%, or 90-10% depending on local standards worldwide. The USGS uses a similar mixture, called Phos Chek G75F.

The heat spreader element or member (preferably in the form of a film, sheet, layer, belt, band, etc. of a highly conducting material such as graphene film or graphitic sheet) may be configured to be in thermal communication with the internal structure of a battery cell (e.g. to abut at least one of the anode and the cathode electrodes in the battery cell). The heat spreader element may be protruded out of a battery cell to make physical or thermal contact with the cooling liquid. Alternatively, the heat spreader element may be in physical contact with a tab (connecting pole or terminal) or cap of a battery cell and this tab or cap is in thermal contact with the cooling liquid.

The case may be partially or fully filled with a second cooling liquid, which may be the same or different than the first cooling liquid. The second cooling liquid may remain stationary inside the case or may circulate out of the case to be in thermal contact with a heat-dissipating device and then circulate back into the case (the enclosure). The case may have at least a first port and a second port configured to allow the second cooling liquid to flow through the case with the battery cells being partially or fully submerged in the cooling liquid. The first and/or the second cooling liquid may be in fluid communication with an external cooling device selected from a heat sink, a heat pipe, a vapor chamber, a stream of flowing fluid, a thermoelectric device, a heat exchanger, a radiator, or a combination thereof.

The heat spreader element preferably comprises a high thermal conductivity material having a thermal conductivity no less than 10 W/mK, preferably from 20 to 1,850 W/mK.

In certain embodiments, the heat spreader element comprises a material selected from a graphene film, flexible graphite sheet, artificial graphite film, a foil of Ag, Ag, Cu, Al, brass, steel, Ti, Ni, Mg alloy sheet, silicon nitride, boron nitride, aluminum nitride, boron arsenide, a composite thereof, or a combination thereof. The graphene film may contain a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

Inside the battery cell, the heat spreader element preferably is in physical or thermal contact with the anode or the cathode and has a heat-spreading area at least 50% (up to 100%) of a surface area of the anode or cathode.

If the heat spreader element comprises a graphene thermal film or artificial graphite thermal film, then the thermal film preferably has a thermal conductivity no less than 600 W/mK, more preferably no less than 1,000 W/mK, and most preferably from 1,500 to 1,850 W/mK. The heat spreader element preferably has a thickness from about 0.1 μm to about 1 mm. The heat spreader element preferably is in a heat-spreading relation to the anode or the cathode and draws heat therefrom during an operation of the battery cells.

In certain embodiments, the battery cell has an anode terminal and a cathode terminal for operating the battery and the heat spreader element is in thermal contact with the anode terminal or the cathode terminal wherein the anode terminal or the cathode terminal is configured to spread heat to the cooling liquid. The heat spreader element may be in thermal contact with the protective housing or a cap of the protective housing.

The disclosure also provides a method of cooling and protecting a battery assembly comprising a plurality of battery cells. In some embodiments, the method comprises holding the plurality of battery cells in a case and operating a cooling liquid distribution system, having a cooling liquid reservoir and/or pipes that are in proximity to at least a subset of the plurality of the cells and configured to deliver, on demand, a desired amount of a first cooling liquid on a cell or multiple cells in the vicinity of the cell when a temperature of the cell exceeds a threshold temperature; wherein the first cooling liquid comprises a fire protection or fire suppression substance which, on contact with the cell, prevents, retards, or extinguishes a cell fire and prevents a propagation or cell-to-cell cascading reactions of a thermal runaway or fire event.

In certain preferred embodiments, the method further comprises implementing at least a heat spreader element between a cell and a pipe or reservoir, in physical or thermal contact with both the cell and the pipe/reservoir, and is configured to transport heat away from the battery cells, in the event of a thermal runaway or fire, through the heat spreader element to the pipe/reservoir to activate the delivery of the desired amount of the first cooling liquid via a heat-induced breach or opening of a valve in the pipe/reservoir. Preferably, the heat spreader element is embedded at least partially inside the cell. This enables a rapid capture of the heat generated by a thermal runaway event inside the cell and rapidly transfers the heat to a breach point or a valve, where a temperature-activated breach or breakage of a pipe occurs or a heat-actuated opening of the valve occurs. In some embodiments, the heat-induced breach comprises melting of a breach point in the pipes at a temperature corresponding to the threshold temperature of the cell. In some embodiments, the opening of a valve in the pipes comprises operating a temperature-activating switch or a temperature actuated valve.

In some embodiments, at least a heat spreader element or a portion of a heat spreader element is in thermal or physical contact with the first cooling liquid which acts to dissipate heat transferred from the battery cell during a normal cell operation.

In some embodiments, the method comprises driving or circulating (e.g. using a pump) a first or second cooling liquid to be in thermal contact with an external cooling or heat-dissipating device. Alternatively, the second cooling liquid may remained contained in the case. The battery cells in the case may be partially or fully submerged in the second cooling liquid. The first cooling liquid and the second cooling liquid may be identical or different in compositions.

In some embodiments, the first and/or the second cooling liquid comprises a fluorinated organic compound selected from a hydrochlorofluorocarbon, hydrofluorocarbon, perfluorocarbon, perfluorinated amine, partially fluorinated ether, hydrofluoroether, hydrofluoroolefin, fluorinated ketone (e.g. $C_6F_{12}O$, $C_7F_{14}O$, and $C_nF_{2n}O$, where n is an integer from 7 to 20), or a combination thereof.

In some embodiments, the first or second cooling liquid comprises a fire protection or fire suppression substance dissolved or dispersed in a dielectric liquid having an electrical conductivity less than $10^{-10}$ S/cm. The cooling liquid preferably has a boiling point from 50° C. to 200° C.

In certain embodiments, in the disclosed method, at least a battery cell comprises a heat spreader element that is disposed inside an internal structure of the cell and is configured to draw heat therefrom and spread heat indirectly through a cell cap or tab or directly into the pipes.

In the disclosed method, the heat spreader element has a thermal conductivity from 10 W/mK to 1,850 W/mK. Preferably, the heat spreader element comprises a graphene film containing a graphene material selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

In some embodiments, the heat spreader element comprises a material selected from graphene sheets, graphene foam, graphene-containing paste, graphene-containing polymer composite, flexible graphite sheet, artificial graphite film, particles of Ag, Ag, Cu, Al, brass, steel, Ti, Ni, Mg alloy, silicon nitride, boron nitride, aluminum nitride, boron arsenide, a composite thereof, or a combination thereof.

In some embodiments, the first or second cooling liquid is in a thermal contact with a heat dissipating or cooling device or provision selected from a heat sink, a heat pipe, a vapor chamber, a stream of flowing fluid, a bath of a coolant fluid, a thermoelectric device, a cooled plate, a heat exchanger, a radiator, or a combination thereof.

In certain embodiments, the graphene film- or graphitic film-based heat spreader element has a thermal conductivity no less than 600 W/mK, preferably no less than 800 W/mK, further preferably no less than 1,000 W/mK, still further preferably no less than 1,200 W/mK, and most preferably no less than 1,500 W/mK (up to 1,800 W/mK).

The cooling liquid is designed to cool down a battery cell or multiple battery cells in a module or pack when the battery is discharged (e.g. when the cell(s) are operated to power an electronic device or EV motor). The heat generated by a cell is captured by the heat spreader element, which transports the heat to the cooling device. The cooling device is preferably selected from a heat sink, a heat pipe, a vapor chamber, a stream of flowing fluid (when an EV is in motion, air may be directed to flow into contact with the heat spreader tabs, for instance), a bath of a coolant fluid, a thermoelectric device, a cooled plate, a heat exchanger, a radiator, or a combination thereof.

In some embodiments, the heat-spreader element acts as a temperature sensor for measuring the temperature of the battery. For instance, a graphene sheet exhibits a resistance that varies with the surrounding temperature and, as such, a simple resistance measurement may be used to indicate the local temperature where the graphene sheet is disposed.

In the cooling and fire protection system, the case may be configured to form multiple loading sites (pores) for accommodating individual battery cells. In some embodiments, the lodging sites comprise cylindrical pores to accommodate cylindrical-shape battery cells or rectangular pores to accommodate rectangular-shape battery cells. There may be spaces between individual cells to accommodate the cooling liquid.

The second cooling and protection liquid may be stationary (non-flowing) fluid residing in the case. Alternatively, the cooling liquid may be configured to flow into the case and flow out of the case, carrying heat away from the battery cells. The heat is then dissipated through a cooling device selected from a heat sink, a heat pipe, a vapor chamber, a stream of flowing fluid, a bath of a coolant fluid, a thermoelectric device, a cooled plate (cold plate), a heat exchanger, a radiator, or a combination thereof.

DETAILED DESCRIPTION OF PREFERRED EMBODIMENTS

Figure 1A:
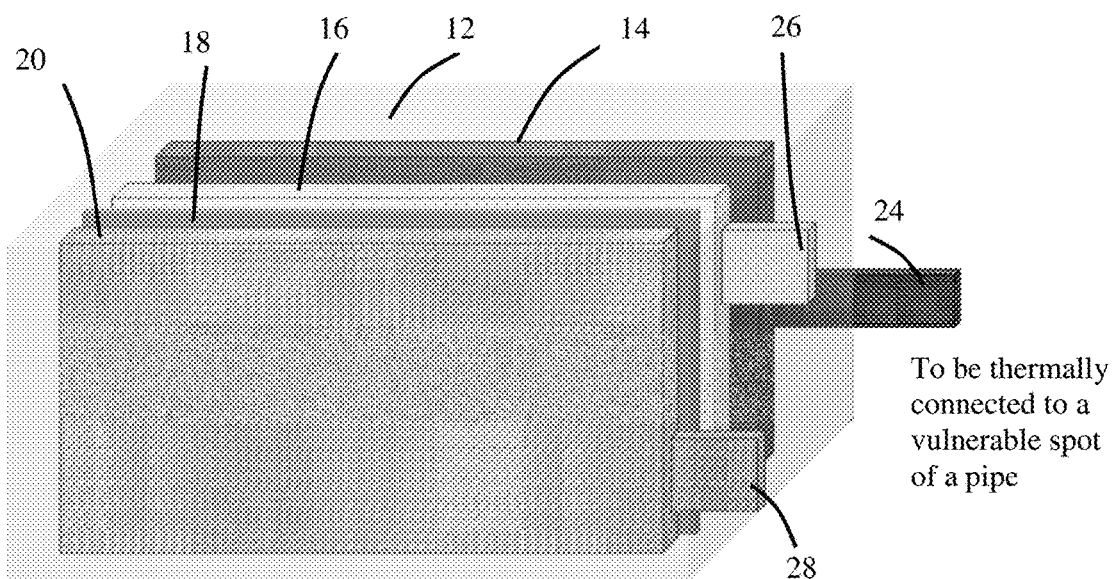
FIG. 1(A) Schematic of a rectangular battery cell in a battery module or pack according to an embodiment of the present disclosure; a heat spreader element is protruded out of the battery cell to facilitate direct contact with a pipe or reservoir containing therein a cooling and fire protection liquid.

The present discussion of preferred embodiments makes use of lithium-ion battery as an example. The present disclosure is applicable to a wide array of primary and secondary (rechargeable) batteries, not limited to the lithium-ion batteries. Examples of the rechargeable batteries include the lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, and supercapacitor.

Rechargeable cells such as lithium-ion cells are prone to thermal runaway which occurs when the internal reaction rate increases to the point that more heat is being generated than can be withdrawn, leading to a further increase in both reaction rate and heat generation. Eventually the amount of heat generated may be sufficiently high to result in the combustion of the battery and the materials in the vicinity. Thermal runaway may be initiated by a number causes, such as short circuit within the cell, improper cell use, physical abuse, manufacturing defects, or exposure of the cell to extreme external temperatures.

During a thermal runaway event, a large amount of energy is rapidly released, heating the entire cell up to a temperature of 900° C. or more. Such a rapidly reached temperature may also lead to a rapid increase in the temperature of adjacent cells within the battery pack. If the temperature of these adjacent cells is allowed to increase unimpeded, they may also enter into a state of thermal runaway, leading to a cascading effect where the initiation of thermal runaway within a single cell propagates possibly throughout the entire battery pack. A likely result is an uncontrollable fire and explosion.

It may be noted that even though a battery pack installed in an EV or other power systems is typically controlled by a battery thermal management (BTM) system. Even with a highly advanced BTM, battery packs can still suffer from thermal runaway events.

Battery thermal management systems can be divided into two groups: active BTM systems and passive BTM systems. An active BTM system dissipates the heat generated from batteries by circulating the cooling air or coolant around the batteries. This system generally needs a power-consuming device, such as a pump or a cooling fan, to circulate the cooling medium. An active BTM system is efficient in managing the battery temperature, but it consumes part of the battery energy and adds complexities to the system.

In contrast, a passive BTM system absorbs the heat generated from batteries by filling cooling materials with high specific heat (e.g. water/glycol mixture) in between batteries. A passive BTM system may also make use of a phase change material (PCM). Amongst the drawbacks of passive BTM systems is that the addition of the cooling material increases the weight of the battery system and reduces the volume of active charge storing material, thus reducing the specific energy of the battery system. Accordingly, there is a drive to use the minimum amount of cooling material to achieve the best cooling effect and minimal reduction in the specific energy of a secondary battery.

The present disclosure provides a battery cooling and fire protection system for a battery module/pack (comprising one or a plurality of battery cells), which can be part of a passive or active BTM.

The present disclosure provides a battery assembly having a distributed cooling and fire protection system, the battery assembly comprising: (a) plurality of battery cells; (b) a case (or enclosure) configured to hold the plurality of battery cells, having an empty space around each cell to accommodate a desired amount of a first cooling liquid; and (c) a cooling liquid distribution system, having a cooling liquid reservoir and/or pipes (conduits) that are in proximity to at least a subset of the plurality of the cells and configured to deliver, on demand, the desired amount of the cooling liquid on (to be in contact with) a cell or multiple cells in the vicinity of the cell or into the empty space surrounding the cell when a temperature of the cell exceeds a threshold temperature; wherein the first cooling liquid comprises a fire protection or fire suppression substance which, on contact with the cell, prevents, retards, or extinguishes a cell fire and prevents a propagation or cell-to-cell cascading reactions of a thermal runaway or fire event.

Preferably, at least one of the battery cells (more preferably each and every of the battery cells) comprises at least one heat spreader element disposed partially or entirely inside a protective housing of the cell, wherein the heat spreader element is in thermal communication with the pipes or reservoir and is configured to transport heat away from the battery cells through the heat spreader element to the pipes or reservoir to activate the delivery of the desired amount of the first cooling liquid via a heat-induced breach (or breakage) or opening of a valve in the pipes, allowing the protective liquid to flow out of pipe/reservoir and poured over the cell(s).

In a preferred embodiment, for instance, the heat spreader element comprises a graphene film or graphitic film (e.g. artificial graphite film obtained from carbonization and graphitization of polyimide film). Due to the exceptionally high thermal conductivity of graphene (the highest among all materials known to scientists), such implementation of a graphene heat spreader member can rapidly transport the heat out of the battery cells. At least some part of the heat spreader element (member) may be in thermal contact with the cooling liquid, reducing or eliminating the need to have complex, bulky or heavy cooling apparatus. In the event of a battery cell thermal runaway, the huge amount of heat energy can be rapidly transferred to one or a plurality of vulnerable spots (breakage points), inducing breakage to let the cooling liquid (a fire-fighting liquid as well) flow out of the pipe/reservoir to suppress fire or prevent cell-to-cell chain reactions. The disclosed cooling system per se can be a passive cooling system or part of an active cooling system.

According to some embodiments of the disclosure, the battery assembly has multiple cells protected by a cooling and fire protection system. As illustrated in FIG. 1(A), the battery cell comprises an anode (negative electrode) 16, a cathode (positive electrode) 20, a separator 18 and electrolyte (not shown) disposed between the anode and the cathode, a casing or protective housing 12 that substantially encloses the above-listed components. Also enclosed is a heat spreader element 14, wherein the heat spreader element has a tab 24 protruded out of the battery cell housing 12 to be in direct contact with a vulnerable spot of a pipe or reservoir of a cooling and protective liquid (not shown). Also protruded out of the housing are a negative electrode terminal 26 connected to or integral with the anode 16 and a positive electrode terminal 28 connected to or integral with the cathode 20. The two electrode terminals are to be reversibly contacted with a battery charger (during battery charging) or a load (e.g. an electronic device, such as a smart phone, to be powered by the battery while discharging).

It is the heat spreader element tab 24 that is in thermal or physical contact with a vulnerable spot of a pipe/reservoir.

In some preferred embodiments, at least part of the heat spreader element is in physical or thermal contact with the cooling liquid inside the pipe/reservoir; this arrangement enabling the battery cell to be cooled by the liquid when the cell is in operation. However, in the event of a thermal runaway, the heat built up inside a cell can be rapidly transferred to a vulnerable spot to active the pouring of the protective liquid over the cell or several cells in the vicinity.

Figure 1B:
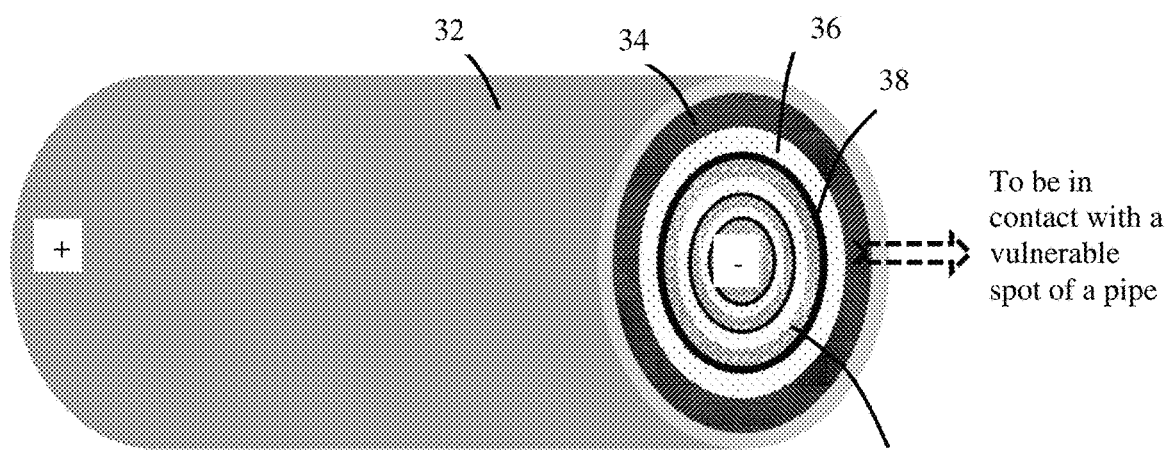
FIG. 1(B) Schematic of a cylindrical battery cell in a battery module or pack according to an embodiment of the present disclosure; a heat spreader element is connected to a cap or tab of the battery cell, wherein the cap or tab is intended to be in direct contact with a pipe or reservoir containing therein a cooling and fire protection liquid.

As illustrated in FIG. 1(B), according to another embodiment of the disclosure, the battery cell (a cylindrical cell) has a heat spreader element in thermal or physical contact with a cell cap, which is to be in contact with a pipe/reservoir. The battery cell comprises an anode 36, a cathode 40, a thin separator 38 and electrolyte (not shown) disposed between the anode and the cathode, a casing or protective housing 32 that substantially encloses the above-listed components. Also enclosed is a heat spreader element 34, which has one end in thermal contact with a housing cap (not shown); this cap, in combination with the housing 32, substantially seals the entire battery cell. This cap is to be in contact with a vulnerable spot of a pipe/reservoir of a cooling/protecting liquid. This cap may also serve as a terminal (e.g. negative terminal) for the battery cell; the positive terminal being located at the opposite end of this cylindrical cell. Alternatively, this cap may serve as a positive terminal and the opposite end is a negative terminal.

Figure 1C:
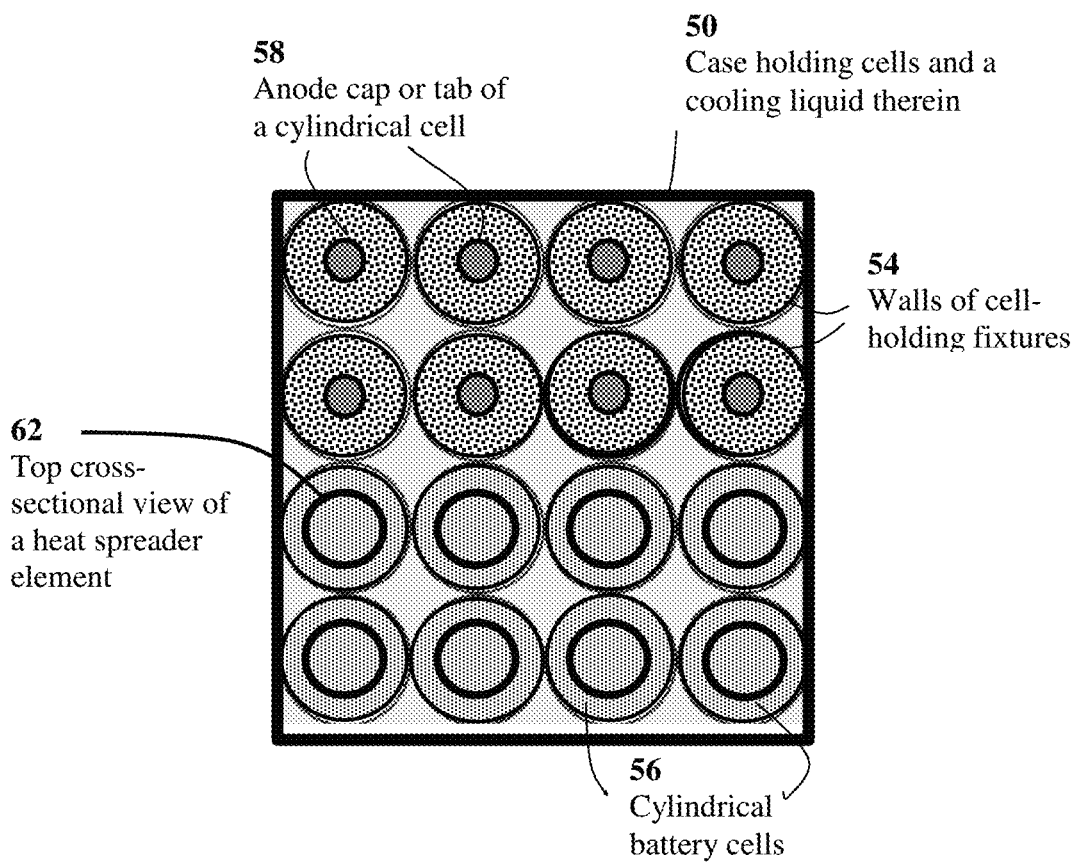
FIG. 1(C) Schematic of a battery module that comprises multiple battery cells positioned inside a case (enclosure) wherein, for illustration purpose, two types of cells are enclosed. For one type of cells, each cell has a heat spreader element inside the cell but in physical contact with a cap which is in turn in thermal contact with a vulnerable spot of a reservoir or pipe containing a cooling and fire protection liquid therein, as illustrated in FIG. 1(D). For the other type of cells, each has a heat spreader element protruded out of the cell that is intended for a direct contact with a vulnerable spot of a reservoir or pipe.

Illustrated in FIG. 1(C) is portion of a disclosed battery assembly having a cooling and fire protection system, according to certain embodiments of the present disclosure. The system comprises a case 50 that holds multiple battery cells (e.g. 56). The case has multiple cell-holding sites (e.g. 52), which may comprise cell-holding fixtures (e.g. 54). The battery cells may have an end cap or tab (e.g. 58) that is to be in contact with a vulnerable spot of a pipe/reservoir of the cooling/protecting liquid. Alternatively, the cell may have the heat spreader element (e.g. 62) protruding out of the battery cell to be in contact with a vulnerable spot of a pipe/reservoir of the cooling/protecting liquid.

Figure 1D:
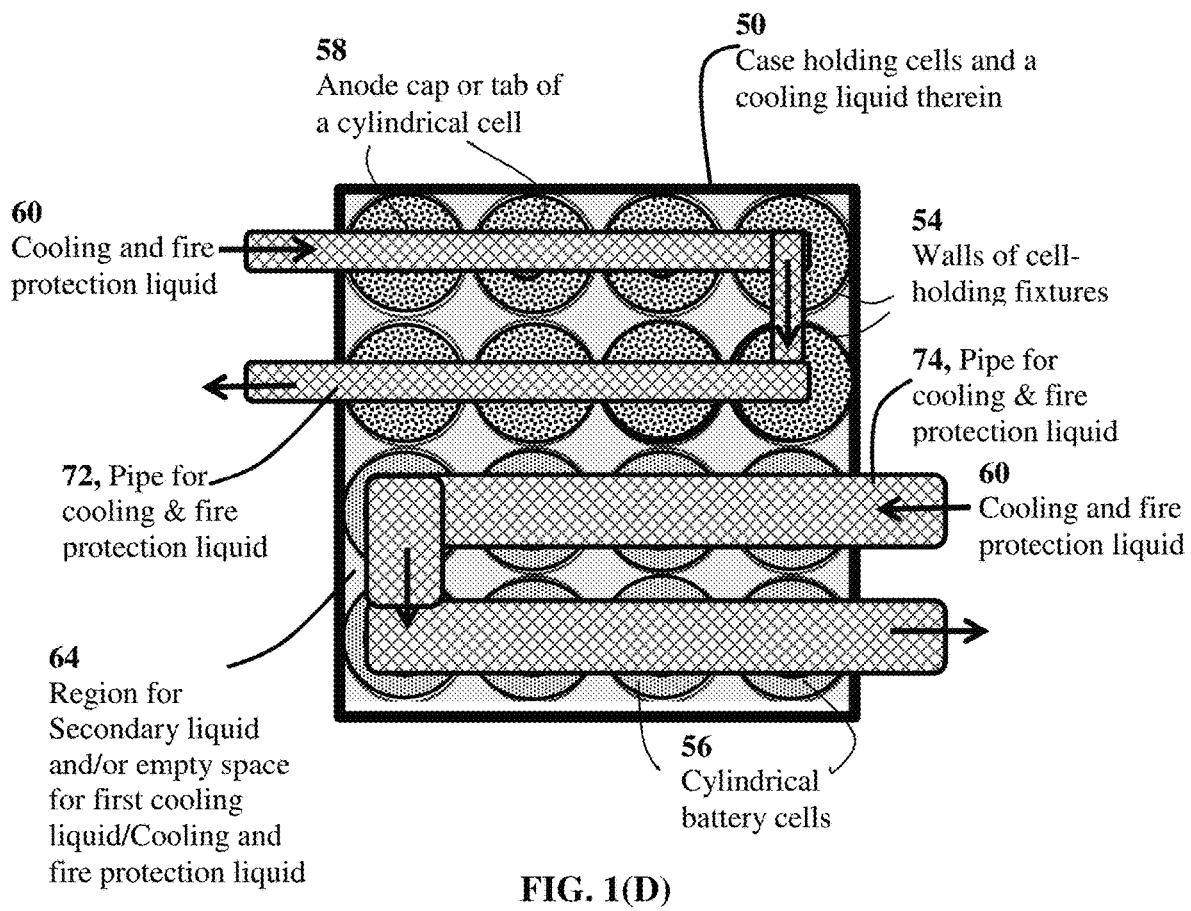
FIG. 1(D) Schematic of the same module as in FIG. 1(C), but having pipes containing a cooling and fire protection liquid therein that are disposed above the cells wherein the pipe has vulnerable spots (heat-induced breakage points) in direct contact with cell caps or heat spreader elements.
Figure 1E:
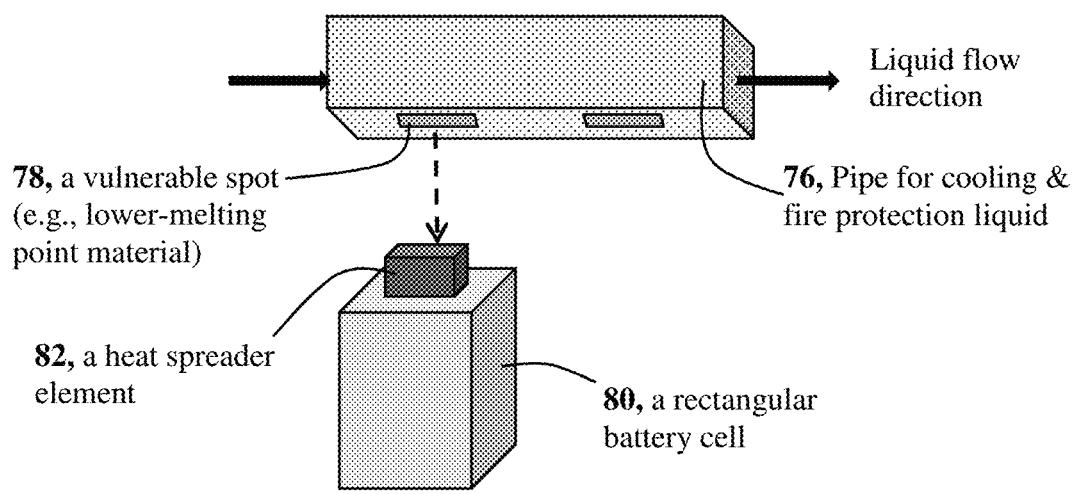
FIG. 1(E) Schematic drawing depicting a vulnerable spot of a pipe that is intended to be in direct contact with a heat spreader element of a battery cell, according to some embodiments of the present disclosure.
Figure 1F:
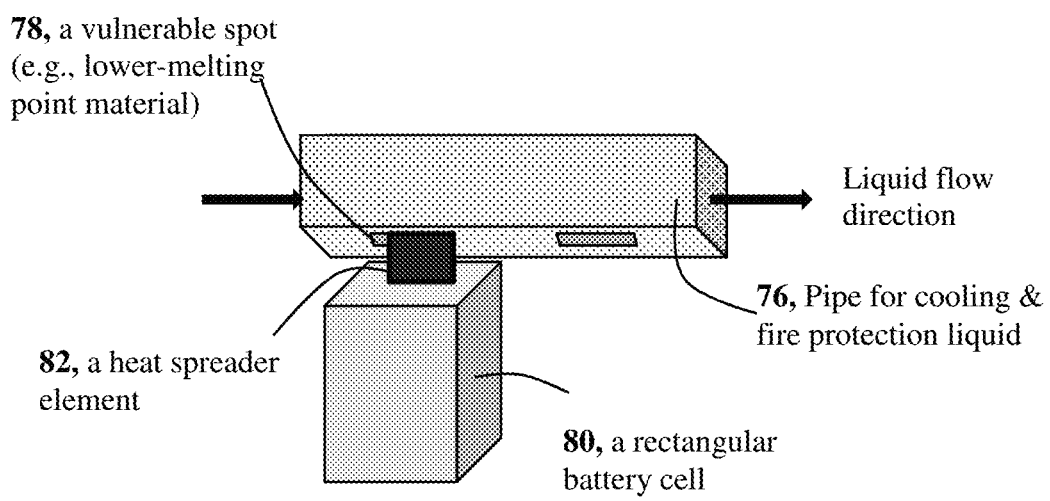
FIG. 1(F) Schematic drawing depicting vulnerable spot of a pipe in direct contact with a heat spreader element of a battery cell, according to some embodiments of the present disclosure.

FIG. 1(D) schematically shows the same module as in FIG. 1(C), but having pipes 72, 74 containing a cooling and fire protection liquid therein that are disposed above the cells wherein the pipes have vulnerable spots (heat-induced breakage points) in direct contact with cell caps or heat spreader elements. Reference 60 shows the cooling and fire protection liquid also referred to as the first cooling liquid, which is within 72 or 74. 64 shows the region in which the secondary liquid may partially submerge the purity of cells. Reference 64 is also the region with space to accommodate a desired amount of a first cooling liquid when it is released from 72 or 74. In some embodiments the volume of empty space in 64 may be adjusted to modify or control the desired amount of the first cooling liquid delivered. For illustration purposes, FIG. 1(E) shows a schematic drawing depicting a vulnerable spot 78 of a pipe 76 that is intended to be in direct contact with a heat spreader element 82 of a battery cell 80, according to some embodiments of the present disclosure. FIG. 1(F) shows an embodiment of the heat spreader element 82 in direct contact with 78 and 76, but FIG. 1(F) is alternatively drawn to more clearly show physical spacing, and more clearly show the direct contact between 82 and 78, and between 82 and 76.

The vulnerable spots or designated breakage points may comprise some materials that soften, melt, or somehow crack open at a preset threshold temperature, preferably from 70° C. to 200° C. and more preferably from 85 to 150° C. Many materials have this feature. For instance, polystyrene has a glass transition point at approximately 100° C.

and can get softened near this temperature. Polyethylene has a melting temperature at 120-135° C.

Many Sn/Pb/Ag alloys, indium-based alloys, and bismuth-based alloys have a melting point or eutectic point below 200° C., or even below 100° C. For instance, 66.3% In/33.7% Bi (72° C. eutectic); 57% Bi/26% In/17% Sn (79° C. eutectic); 54% Bi/29.7% In/16.3% Sn (81° C. eutectic).

These materials may be used at the vulnerable spots of a pipe or reservoir. Heat generated from a battery cell in the event of a near thermal runaway can be rapidly transported through the heat spreader element to a vulnerable spot, melting the material to create a breakage to inject the cooling/protecting liquid out of the pipe/reservoir. Due to the exceptionally high thermal conductivity of the graphene material (for instance), heat can rapidly spread from the internal structure of a battery cell to the graphene film-based heat spreader element, which conducts the heat out of the cell to the breakage point.

Alternatively, the vulnerable spot or designated breakage point may comprise a valve that is preferably based on a heat-sensitive actuator. In other words, the valve can be turned on if the valve per se or an associated sensor senses a temperature exceeding a threshold temperature, allowing the cooling/protecting liquid to flow out of the pipe/reservoir. In some embodiments, the valve is turned off if the sensed temperature goes below a second threshold temperature. Thermally induced actuators are well-known in the art; for instance, the thermostat used in the household heating/cooling system makes use of a bi-metallic switch.

The pipes may help direct the flow of the cooling/protecting liquid to be in contact with external cooling device to keep the battery cells cool provided at least a part of a heat spreader element is in thermal communication with the cooling/protecting liquid. There is no limitation on the type of cooling device that can be implemented to cool down the cooling liquid, which in turn cools down the battery cells when working to power an electronic device or an EV. Again, the cooling device may be selected from a heat sink, a heat pipe, a vapor chamber, a stream of flowing fluid, a thermoelectric device, a cooled/refrigerated plate, a heat exchanger, a radiator, or a combination thereof.

In certain preferred embodiments of the disclosed battery assembly, at least a heat spreader element or a portion of a heat spreader element is in thermal or physical contact with the first cooling liquid which acts to dissipate heat transferred from the battery cell during a normal cell operation. For instance, the heat spreader element protruded out of a cell may be split into two portions, one being in contact with a vulnerable spot and the other and the other being submerged in the cooling liquid.

It is important that the heat spreader element has a high thermal conductivity to allow for rapid transfer of a large amount of heat from the battery cells through the heat spreader element and a cooling liquid to a cooling device when the cell is discharged.

In certain embodiments, the heat-spreader element comprises a high thermal conductivity material having a thermal conductivity no less than 10 W/mK (preferably no less than 200 W/mK, further preferably greater than 600 W/mK, more preferably greater than 1,000 W/mK, and most preferably greater than 1,500 W/mK). Preferably, the heat spreader element comprises a material selected from graphene film (e.g. composed of graphene sheets aggregated together or bonded together into a film or sheet form, typically having a thermal conductivity from 800 W/mK to 1,850 W/mK and a thickness from 10 nm to 5 mm) or graphene-reinforced composite.

The heat spreader element may comprise a material selected from graphene sheets, graphene foam, graphene-containing composite, flexible graphite sheet, artificial graphite film (e.g. produced from carbonization and graphitization of a polymer film or pitch film), foil of Ag, Ag, Cu, Al, brass, steel, Ti, Ni, Mg alloy, silicon nitride, boron nitride, aluminum nitride, boron arsenide, a composite thereof, or a combination thereof.

The graphene film contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The graphene film typically exhibits a thermal conductivity from 800 to 1,850 W/mK. Flexible graphite sheet typically exhibits a thermal conductivity from 150 to 600 W/mK. Artificial graphite films (e.g. those produced by carbonizing and graphitizing a polymer film) can exhibit a thermal conductivity from 600 to 1,700 W/mK. Graphene films, flexible graphite sheets, and artificial graphite films are commonly regarded as three distinct classes of materials.

In some embodiments, the battery cooling system further comprises at least a temperature sensor for measuring the surface temperature of the battery cells. In some embodiments, the heat-spreader element acts as a temperature sensor for measuring an internal temperature of the battery. For instance, the graphene sheet exhibits a resistance that varies with the surrounding temperature and, as such, a simple resistance measurement may be used to indicate the local temperature where the graphene sheet is disposed.

Another important ingredient in the presently disclosed battery cooling and fire protection system is the cooling liquid, which itself is a fire protection or fire suppression material or contains a fire protection or fire suppression material. When or if a battery cell catches a fire (e.g. due to thermal runaway caused by lithium dendrite formation, cell overcharging or fast discharging, etc.), the fire would be immediately suppressed since the cell is partially or fully submerged in this cooling and fire protection liquid. This liquid plays a dual role of keeping the battery cells to operate at a safe temperature and to suppress any fire immediately without allowing the fire to spread over to other battery cells or to cause explosion.

Preferably, the fire protection or fire suppression substance comprises a fluorinated organic compound. In certain embodiments, the fluorinated organic compound is selected from the group consisting of hydrochlorofluorocarbons, hydrofluorocarbons, perfluorocarbons, perfluorinated amines, partially fluorinated ethers, hydrofluoroethers, hydrofluorolefins, fluorinated ketones (e.g. $C_6F_{12}O$, $C_7F_{14}O$, and $C_nF_{2n}O$, where n is an integer from 8 to 20), and combinations thereof. In addition to $C_nF_{2n}O$ (n>6), heptafluoropropane is a useful compound. In certain embodiments, the fluorinated organic compound is selected from those having a boiling point from 50 to 200° C., preferably from 65 to 150° C.

The fire suppression substance may be selected from a fluorinated ketone $C_nF_{2n}O$ (6<n<20), heptafluoropropane, trichloromethane, hydrofluoroether, trimethyl phosphate, tripropyl phosphate, or a combination thereof.

In certain embodiments, the cooling liquid comprises a dielectric liquid having the fire protection or fire suppression substance dissolved or dispersed in the dielectric liquid. The fire protection or fire suppression substance may comprise ABC dry chemicals designed for extinguishing class A, class B, and/or class C fires.

It may be noted that monoammonium phosphate, ABC Dry Chemical, ABE Powder, tri-class, or multi-purpose dry chemical is a dry chemical extinguishing agent used on class A, class B, and class C fires. In this classification system, A for "Ash" (referring to ordinary solid combustibles), B for "Barrel" (Flammable liquids and gases), and C for "Current" (energized electrical equipment). It uses a specially fluidized and siliconized monoammonium phosphate powder. ABC dry chemical is usually a mix of monoammonium phosphate and ammonium sulfate, the former being the active one. The mix between the two agents is usually 40-60%, 60-40%, or 90-10% depending on local standards worldwide. The USGS uses a similar mixture, called Phos Chek G75F.

Lithium-ion batteries are subject to a catastrophic failure mode known as thermal runaway under certain conditions. Thermal runaway is a series of internal exothermic reactions that can be caused by electrical overcharge, overheating, or from an internal electrical short. The internal shorts are typically caused by manufacturing defects or impurities, dendritic lithium formation and mechanical damage. In any of these failure conditions, the battery is unable to contain its electrochemical energy resulting in high, localized temperatures and rapid release of energy. In an unprotected standard air atmosphere this high-energy event can increase the temperature of adjacent cells creating a cell-to-cell cascading thermal runaway event that is significantly more energetic than the initial event. By having a heat spreader element connected to the interior structure of a cell on one end and get immersed in the cooling liquid on the other end, one can significantly reduce the propensity of the battery cell initiating a thermal runaway. Even if somehow an unexpectedly high amount of heat is built up in the cell that leads to a thermal runaway, the presently disclosed cooling and fire protection liquid will be directed to prevent cell-to-cell cascading thermal runaway.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In other words, graphene planes (hexagonal lattice structure of carbon atoms) constitute a significant portion of a graphite particle.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. The production of various types of graphene sheets is well-known in the art.

Figure 2A:
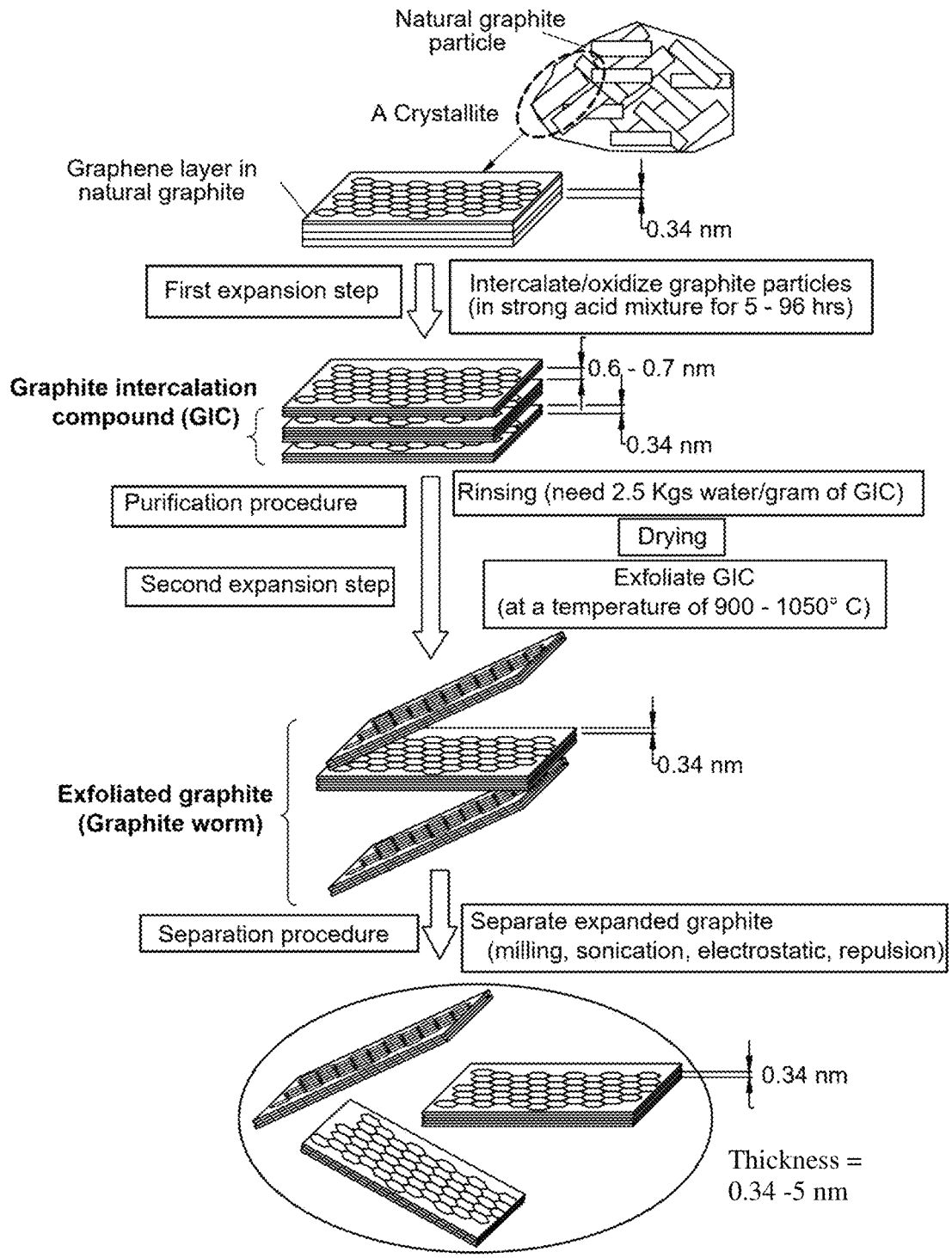
FIG. 2(A) A diagram showing a procedure for producing graphene oxide sheets. These sheets can then be aggregated (e.g. roll-pressed) together or slurry-coated together, followed by a heat treatment procedure to produce graphene films.

For instance, as shown in FIG. 2(A), the chemical processes for producing graphene sheets or platelets typically involve immersing powder of graphite or other graphitic material in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water. The purified product is commonly referred to as graphite intercalation compound (GIC) or graphite oxide (GO). The suspension containing GIC or GO in water may be subjected to ultrasonication to produce isolated/separated graphene oxide sheets dispersed in water. The resulting products are typically highly oxidized graphene (i.e. graphene oxide with a high oxygen content), which must be chemically or thermal reduced to obtain reduced graphene oxide (RGO).

Alternatively, the GIC suspension may be subjected to drying treatments to remove water. The dried powder is then subjected to a thermal shock treatment. This can be accomplished by placing GIC in a furnace pre-set at a temperature of typically 800-1100° C. (more typically 950-1050° C.) to produce exfoliated graphite (or graphite worms), which may be subjected to a high shear or ultrasonication treatment to produce isolated graphene sheets.

Alternatively, graphite worms may be re-compressed into a film form to obtain a flexible graphite sheet, which is a fundamentally distinct material than graphene film. Flexible graphite sheet has a thermal conductivity from 100 to 500 W/mK and, in contrast, graphene film has a thermal conductivity from 800 to 1,800 W/mK. Flexible graphite sheets are commercially available from many sources worldwide.

The starting graphitic material may be selected from natural graphite, synthetic graphite, highly oriented pyrolytic graphite, graphite fiber, graphitic nano-fiber, graphite fluoride, chemically modified graphite, meso-carbon microbead, partially crystalline graphite, or a combination thereof.

Pristine graphene sheets may be produced by the well-known liquid phase exfoliation or metal-catalyzed chemical vapor deposition (CVD).

The highly oriented graphene film (HOGF), as a heat spreader element, may be produced from graphene oxide, graphene fluoride, etc. There is no theoretical limit on the thickness of the HOGF that can be produced using the presently invented process. As an example, the process for producing a graphene thermal film (for use as a graphene heat spreader element) includes:

(a) preparing either a graphene oxide dispersion (GO suspension) having graphene oxide sheets dispersed in a fluid medium or a GO gels having GO molecules dissolved in a fluid medium, wherein the GO sheets or GO molecules contain an oxygen content higher than 5% by weight (typically higher than 10%, more typically higher than 20%, often higher than 30%, and can be up to approximately 50% by weight);

(b) dispensing and depositing the GO dispersion or GO gel onto a surface of a supporting solid substrate to form a layer of graphene oxide (wet layer) having a (wet) thickness preferably less than 10 mm (preferably less than 2.0 mm, more preferably less than 1 mm, and most preferably less than 0.5 mm), wherein the dispensing and depositing procedure (e.g. coating or casting) includes subjecting the graphene oxide dispersion to an orientation-inducing stress;

(c) partially or completely removing the fluid medium from the wet layer of graphene oxide to form a dried layer of graphene oxide having a dried layer thickness less than 2 mm and having an inter-plane spacing $d_{002}$ of 0.4 nm to 1.2 nm as determined by X-ray diffraction and an oxygen content no less than 5% by weight; and (d) heat treating the layer of dried graphene oxide under an optional compressive stress to produce the highly oriented graphene film at a heat treatment temperature higher than 100° C. (typically from 500° C. to 3,200° C.) to an extent that an inter-plane spacing $d_{002}$ is decreased to a value less than 0.4 nm and the oxygen content is decreased to less than 5% by weight. The resulting graphene film may be further compressed to reduce the thickness and increase the physical density of the film. The desired physical density of the graphene film is from 1.7 g/cm$^3$ to 2.25 g/cm$^3$.

In one embodiment, wherein the heat treatment temperature contains a temperature in the range from 500° C.-1,500° C., the resulting highly oriented graphene film structure has an oxygen content less than 1%, an inter-graphene spacing less than 0.345 nm, a thermal conductivity of at least 1,000 W/mK, and/or an electrical conductivity no less than 3,000 S/cm.

In another embodiment, wherein the heat treatment temperature contains a temperature in the range from 1,500° C.-2,100° C., the highly oriented graphene film structure has an oxygen content less than 0.01%, an inter-graphene spacing less than 0.337 nm, a thermal conductivity of at least 1,300 W/mK, and/or an electrical conductivity no less than 5,000 S/cm.

In a preferred embodiment, wherein the heat treatment temperature contains a temperature greater than 2,100° C., the highly oriented graphene structure has an oxygen content no greater than 0.001%, an inter-graphene spacing less than 0.336 nm, a mosaic spread value no greater than 0.7, a thermal conductivity of at least 1,500 W/mK, and/or an electrical conductivity no less than 10,000 S/cm.

In another preferred embodiment, wherein the heat treatment temperature contains a temperature no less than 2,500° C., the highly oriented graphene film structure has an inter-graphene spacing less than 0.336 nm, a mosaic spread value no greater than 0.4, a thermal conductivity greater than 1,600 W/mK, and/or an electrical conductivity greater than 10,000 S/cm.

Typically, the highly oriented graphene film structure exhibits an inter-graphene spacing less than 0.337 nm and a mosaic spread value less than 1.0. More typically, the highly oriented graphene structure exhibits a degree of graphitization no less than 80% (preferably and more typically no less than 90%) and/or a mosaic spread value less than 0.4.

Due to the notion that highly aligned GO sheets or GO molecules can be chemically merged together in an edge-to-edge manner, the resulting highly oriented graphene structure has a grain size that is significantly larger than the maximum grain size of the starting graphitic material prior to or during oxidation of the graphitic material. In other words, if the graphene oxide dispersion is obtained from a graphitic material having a maximum original graphite grain size, then the resulting highly oriented graphene structure is normally a single crystal or a poly-crystal graphene structure having a grain size larger than this maximum original grain size.

Internal structure-wise, the highly oriented graphene structure contains chemically bonded graphene planes that are parallel to one another. The graphene oxide dispersion is typically obtained from a graphitic material having multiple graphite crystallites exhibiting no preferred crystalline orientation as determined by an X-ray diffraction or electron diffraction method. However, the highly oriented graphene structure is typically a single crystal or a poly-crystal graphene structure having a preferred crystalline orientation as determined by said X-ray diffraction or electron diffraction method. In some cases, the highly oriented graphene structure contains a combination of sp$^2$ and sp$^3$ electronic configurations. In the invented process, the step of heat-treating induces chemical linking, merging, or chemical bonding of graphene oxide molecules, and/or re-graphitization or re-organization of a graphitic structure.

In addition to graphene films, another preferred class of thermal films for use as a heat spreader element is the pyrolytic graphite film (also referred to as the graphitic film or artificial graphite film) that is prepared from the carbonization and graphitization of polymer films or pitch films.

Figure 2B:
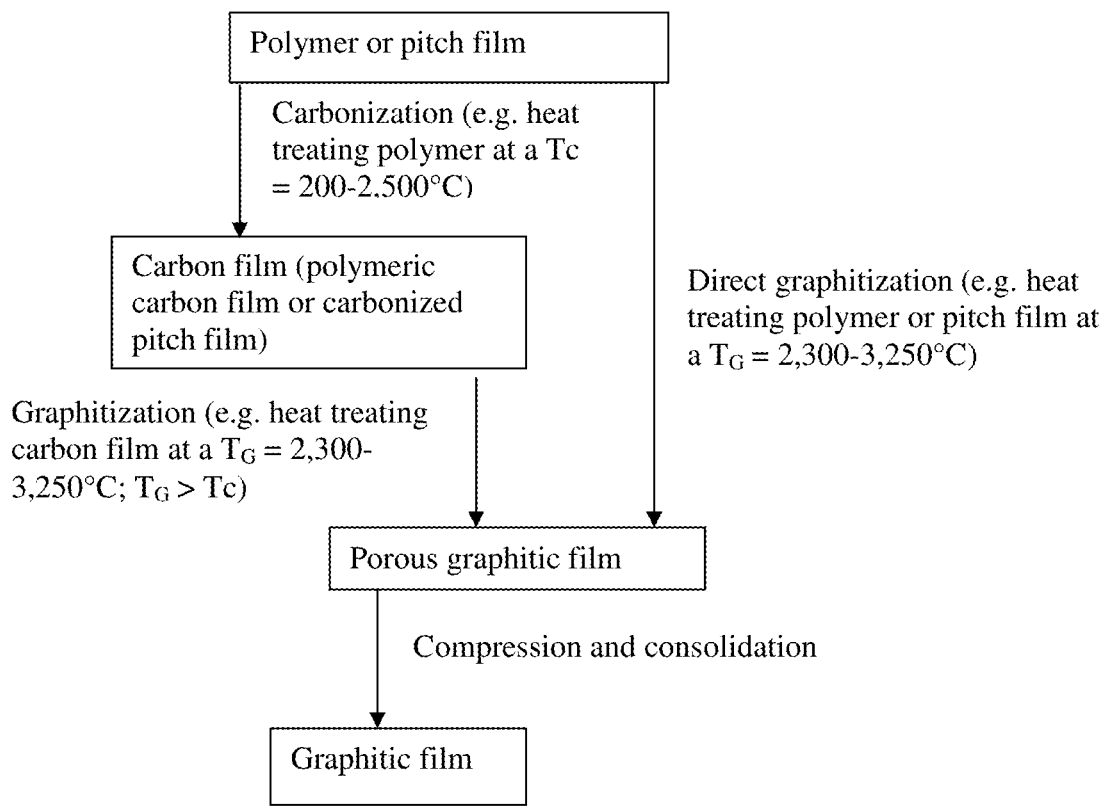
FIG. 2(B) Schematic of a process for producing graphitic films from polymer or pitch films, according to certain embodiments of the disclosure.

For instance, as schematically illustrated in FIG. 2(B), the process begins with carbonizing a polymer film at a carbonization temperature of 200-2,500° C. (more typically 400-1,500° C.) under a typical pressure of 10-15 kg/cm$^2$ for 2-10 hours to obtain a carbonized material, which is followed by a graphitization treatment at 2,500-3,200° C. under an ultrahigh pressure of 100-300 kg/cm$^2$ for 1-5 hours to form a graphitic film. The carbon precursor polymer may be preferably selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, phenolic resin, composites thereof (containing graphene sheets and/or graphite flakes dispersed in the carbon precursor film), and combinations thereof. These polymers are found to have a high carbon yield when they are carbonized and/or graphitized.

An example of this process is disclosed in Y. Nishikawa, et al. "Filmy graphite and process for producing the same," U.S. Pat. No. 7,758,842 (Jul. 20, 2010) and in Y. Nishikawa, et al. "Process for producing graphite film," U.S. Pat. No. 8,105,565 (Jan. 31, 2012).

The rechargeable battery that can take advantage of the presently disclosed cooling system may be a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor.

The disclosure also provides a method of cooling and protecting a battery assembly comprising a plurality of battery cells. In some embodiments, the method comprises holding the plurality of battery cells in a case and operating a cooling liquid distribution system, having a cooling liquid reservoir and pipes that are in proximity to at least a subset of the plurality of the cells and configured to deliver, on demand, a desired amount of a first cooling liquid on a cell or multiple cells in the vicinity of the cell when a temperature of the cell exceeds a threshold temperature; wherein the first cooling liquid comprises a fire protection or fire suppression substance which, on contact with the cell, prevents, retards, or extinguishes a cell fire and prevents a propagation or cell-to-cell cascading reactions of a thermal runaway or fire event.

In certain preferred embodiments, the method further comprises implementing at least a heat spreader element between a cell and a pipe, in physical or thermal contact with both the cell and the pipe, and is configured to transport heat away from the battery cells, in the event of a thermal runaway or fire, through the heat spreader element to the pipe to activate the delivery of the desired amount of the first cooling liquid via a heat-induced breach or opening of a valve in the pipe. Preferably, the heat spreader element is embedded at least partially inside the cell. This enables a rapid capture of the heat generated by a thermal runaway event inside the cell and rapidly transfers the heat to a breach point or a valve, where a temperature-activated breach or breakage of a pipe occurs or a heat-actuated opening of the valve occurs.

In some embodiments, the heat-induced breach comprises melting of a breach point in the pipes at a temperature corresponding to the threshold temperature of the cell. In some embodiments, the opening of a valve in the pipes comprises operating a temperature-activating switch or a temperature actuated valve.

In some embodiments, at least a heat spreader element or a portion of a heat spreader element is in thermal or physical contact with the first cooling liquid which acts to dissipate heat transferred from the battery cell during a normal cell operation.

In some embodiments, the method comprises driving or circulating (e.g. using a pump) a first or second cooling liquid to be in thermal contact with an external cooling or heat-dissipating device. Alternatively, the second cooling liquid may remained contained in the case. The battery cells in the case may be partially or fully submerged in the second cooling liquid. The first cooling liquid and the second cooling liquid may be identical or different in compositions.

In some embodiments, the cooling liquid is or comprises a fluorinated organic compound selected from a hydrochlorofluorocarbon, hydrofluorocarbon, perfluorocarbon, perfluorinated amine, partially fluorinated ether, hydrofluoroether, hydrofluoroolefin, fluorinated ketone (e.g. $C_6F_{12}O$, $C_7F_{14}O$, and, in general, $C_nF_{2n}O$, where n is an integer from 6 to 20), or a combination thereof. The chemical $C_6F_{12}O$ (where n=6) has a boiling point of 49° C. will make handling an organic vapor challenging when the battery cells (e.g. in an electric vehicle) are in full operation or exposed to sunshine in a hot summer day. The cell temperature can reach 65° C., sometimes >75° C. or even 85° C. Hence, a cooling liquid preferably has a boiling point from 50° C. to 200° C., more preferably >65° C. (e.g. $C_nF_{2n}O$ with n>6), further preferably >75° C. (e.g. $C_nF_{2n}O$ with n>7), and still more preferably >85° C. (e.g. $C_nF_{2n}O$ with n>8).

In some embodiments, the cooling liquid comprises a fire protection or fire suppression substance dissolved or dispersed in a dielectric liquid having an electrical conductivity less than $10^{-10}$ S/cm. The cooling liquid can contain water provided the fire protection or suppression chemical is compatible with water.

In certain embodiments, in the disclosed method, at least a battery cell comprises a heat spreader element that is disposed inside an internal structure of the cell and is configured to draw heat therefrom and spread heat indirectly through a cell cap or tab or directly into the pipe/reservoir of a cooling/protecting liquid. The heat spreader element preferably has a thermal conductivity from 10 W/mK to 1,850 W/mK. Preferably, the heat spreader element comprises a graphene film containing a graphene material selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

The heat spreader element may comprise a material selected from graphene sheets, graphene foam, graphene-containing composite, flexible graphite sheet, artificial graphite film, foils of Ag, Ag, Cu, Al, brass, steel, Ti, Ni, Mg alloy, silicon nitride, boron nitride, aluminum nitride, boron arsenide, a composite thereof, or a combination thereof. The graphene film- or graphitic film-based heat spreader element preferably has a thermal conductivity no less than 600 W/mK, preferably no less than 800 W/mK, further preferably no less than 1,000 W/mK, still further preferably no less than 1,200 W/mK, and most preferably no less than 1,500 W/mK (up to 1,800 W/mK).

The cooling liquid is preferably in a thermal contact with a heat dissipating or cooling device or provision selected from a heat sink, a heat pipe, a vapor chamber, a stream of flowing fluid, a bath of a coolant fluid, a thermoelectric device, a cooled plate, a heat exchanger, a radiator, or a combination thereof.

The cooling liquid is designed to cool down a battery cell or multiple battery cells in a module or pack when the battery is discharged (e.g. when the cell(s) are operated to power an electronic device or EV motor) or charged. The heat generated by a cell is captured by the heat spreader element, which transports the heat to the cooling liquid which preferably in turn makes thermal contact with a heat dissipating or cooling device or provision. The heat dissipating or cooling device or provision is preferably selected from a heat sink, a heat pipe, a vapor chamber, a stream of flowing fluid (when an EV is in motion, air may be directed to flow into contact with the heat spreader tabs, for instance), a bath of a coolant fluid, a thermoelectric device, a cooled plate, a heat exchanger, a radiator, or a combination thereof.

In the battery assembly cooling and fire protection system, the case may be configured to form multiple loading sites (pores) for accommodating individual battery cells. In some embodiments, the lodging sites comprise cylindrical pores to accommodate cylindrical-shape battery cells or rectangular pores to accommodate rectangular-shape battery cells. There may be spaces between individual cells to accommodate the cooling liquid.

The cooling and protection liquid may be a stationary (non-flowing) fluid residing in the pipe or reservoir. Alternatively, the cooling liquid may be configured to flow to a heat-dissipating or cooling device or provision.

The following examples serve to provide the best modes of practice for the present disclosure and should not be construed as limiting the scope of the disclosure:

Example 1: Preparation of Single-Layer Graphene Sheets and their Heat-Spreader Films from Meso-Carbon Micro-Beads (MCMBs)

Meso-carbon microbeads (MCMBs) were supplied from China Steel Chemical Co., Kaohsiung, Taiwan. This material has a density of about 2.24 g/cm³ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. The GO suspension was cast into thin graphene oxide films on a glass surface and, separately, was also slot die-coated onto a PET film substrate, dried, and peeled off from the PET substrate to form GO films. The GO films were separately heated from room temperature to 2,500° C. and then roll-pressed to obtain reduced graphene oxide (RGO) films for use as a heat spreader. The thermal conductivity of these films was found to be from 1,225 to 1,750 W/mK using Neitze heat conductivity measuring device.

Example 2: Preparation of Pristine Graphene Sheets (0% Oxygen) and Heat Spreader Films Pristine graphene sheets were produced by using the direct ultrasonication or liquid-phase production process. In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

The pristine graphene sheets were immersed into a 10 mM acetone solution of BPO for 30 min and were then taken out drying naturally in air. The heat-initiated chemical reaction to functionalize graphene sheets was conducted at 80° C. in a high-pressure stainless steel container filled with pure nitrogen. Subsequently, the samples were rinsed thoroughly in acetone to remove BPO residues for subsequent Raman characterization. As the reaction time increased, the characteristic disorder-induced D band around 1330 $cm^{-1}$ emerged and gradually became the most prominent feature of the Raman spectra. The D-band is originated from the $A_{1g}$ mode breathing vibrations of six-membered $sp^2$ carbon rings, and becomes Raman active after neighboring $sp^2$ carbon atoms are converted to $sp^3$ hybridization. In addition, the double resonance 2D band around 2670 $cm^{-1}$ became significantly weakened, while the G band around 1580 $cm^{-1}$ was broadened due to the presence of a defect-induced D' shoulder peak at ~1620 $cm^{-1}$. These observations suggest that covalent C—C bonds were formed and thus a degree of structural disorder was generated by the transformation from $sp^2$ to $sp^3$ configuration due to reaction with BPO.

The functionalized graphene sheets were re-dispersed in water to produce a graphene dispersion. The dispersion was then made into graphene films using comma coating and subjected to heat treatments up to 2,500° C. The heat spreader films obtained from functionalized graphene sheets exhibit a thermal conductivity from 1,450 to 1,750 W/mK.

On a separate basis, non-functionalized pristine graphene powder was directly compressed into graphene films (aggregates of graphene sheets) using pairs of steel rollers; no subsequent heat treatment was conducted. These graphene films exhibit a thermal conductivity typically from approximately 600 to about 1,000 W/mK.

Example 3: Preparation of Graphene Fluoride Sheets and Heat Spreader Films

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but a longer sonication time ensured better stability. Upon extrusion to form wet films on a glass surface with the solvent removed, the dispersion became brownish films formed on the glass surface. The dried films, upon drying and roll-pressing, became heat spreader films having a reasonably good thermal conductor (thermal conductivity from 250 to 750 W/mK), yet an electrical insulator. The unique combination of electrical insulation and thermal conduction characteristics is of particular interest for battery heating configurations wherein there is no concern of any potential negative effect cause by an electrical conductor.

Example 4: Preparation of Nitrogenated Graphene Sheets and Graphene Films for Use as a Heat Spreader Element Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 have the nitrogen contents of 14.7, 18.2 and 17.5 wt. %, respectively, as found by elemental analysis. These nitrogenated graphene sheets, without prior chemical functionalization, remain dispersible in water. The resulting suspensions were then coated and made into wet films and then dried. The dried films were roll-pressed to obtain graphene films, having a thermal conductivity from 350 to 820 W/mK. These films are also electrical insulators.

Some of these films were subjected to heat treatments at 300° C. for 2 hours and then at 2,800° C. for 2 hours. The resulting graphene films show a thermal conductivity from 1,200 to 1,700 W/mK.

Example 5: Fluorination of Graphite to Produce Exfoliated Graphite and Flexible Graphene Sheets Natural graphite flakes, a sieve size of 200 to 250 mesh, were heated in vacuum (under less than $10^{-2}$ mmHg) for about 2 hours to remove the residual moisture contained in the graphite. Fluorine gas was introduced into a reactor and the reaction was allowed to proceed at 375° C. for 120 hours while maintaining the fluorine pressure at 200 mmHg. This was based on the procedure suggested by Watanabe, et al. disclosed in U.S. Pat. No. 4,139,474. The powder product obtained was black in color. The fluorine content of the product was measured as follows: The product was burnt according to the oxygen flask combustion method and the fluorine was absorbed into water as hydrogen fluoride. The amount of fluorine was determined by employing a fluorine ion electrode. From the result, we obtained a GF (Sample 5A) having an empirical formula $(CF_{0.75})_n$. X-ray diffraction indicated a major (002) peak at $2\theta=13.5$ degrees, corresponding to an inter-planar spacing of 6.25 Å. Some of the graphite fluoride powder was thermally exfoliated to form graphite worms, which were air jet-milled to obtain expanded graphite flakes. The expanded graphite flakes were then compressed into graphitic sheets.

Example 6: Preparation of Polybenzoxazole (PBO) Films, Graphene-PBO Films, and Expanded Graphite Flake-PBO Films (Followed by Carbonization/Graphitization to Produce Pyrolytic Films)

Polybenzoxazole (PBO) films were prepared via casting and thermal conversion from its precursor, methoxy-containing polyaramide (MeO-PA). Specifically, monomers of 4, 4'-diamino-3,3'-dimethoxydiphenyl (DMOBPA), and isophthaloyl dichloride (IPC) were selected to synthesize PBO precursors, methoxy-containing polyaramide (MeO-PA) solution. This MeO-PA solution for casting was prepared by polycondensation of DMOBPA and IPC in DMAc solution in the presence of pyridine and LiCl at −5° C. for 2 hr, yielding a 20 wt % pale yellow transparent MeO-PA solution. The inherent viscosity of the resultant MeO-PA solution was 1.20 dL/g measured at a concentration of 0.50 g/dl at 25° C. This MeO-PA solution was diluted to a concentration of 15 wt % by DMAc for casting.

The as-synthesized MeO-PA was cast onto a glass surface to form thin films (35-120 μm) under a shearing condition. The cast film was dried in a vacuum oven at 100° C. for 4 hr to remove the residual solvent. Then, the resulting film with thickness of approximately 28-100 μm was treated at 200° C.-350° C. under $N_2$ atmosphere in three steps and annealed for about 2 hr at each step. This heat treatment serves to thermally convert MeO-PA into PBO films. For comparison, both graphene-PBO and expanded graphite flake-PBO films were made under similar conditions. The graphene or EP flake proportions were varied from 10% to 90% by weight.

All the films prepared were pressed between two plates of alumina while being heat-treated (carbonized) under a 3-sccm argon gas flow in three steps: from room temperature to 600° C. in 1 h, from 600 to 1,000° C. in 1.5 h, and maintained at 1,000° C. for 1 h. The carbonized films were then roll-pressed in a pair of rollers to reduce the thickness by approximately 40%. The roll-pressed films were then subjected to graphitization treatments at 2,200° C. for 5 hours, followed by another round of roll-pressing to reduce the thickness by typically 20-40%.

The thermal conductivity values of a series of graphitic films derived from graphene-PBO films of various graphene weight fractions (from 0% to 100%) were measured. Significantly and unexpectedly, some thermal conductivity values are higher than those of both the film derived from PBO alone (860 W/mK) and the graphene paper derived from graphene sheets alone (645 W/mK). Quite interestingly, the neat PBO-derived graphitic films prepared under identical conditions exhibit a highest conductivity value of 860 W/mK, yet several combined graphene-PBO films, when carbonized and graphitized, exhibit thermal conductivity values of 924-1,145 W/mK.

The thermal conductivity values of a series of graphitic films derived from EP-PBO films of various weight fractions of expanded graphite flakes (EP, from 0% to 100%) were also obtained.

Example 7: Preparation of Polyimide (PI) Films, Graphene-PI Films, and the Heat Treated Versions Thereof The synthesis of conventional polyimide (PI) involved poly(amic acid) (PAA, Sigma Aldrich) formed from pyromellitic dianhydride (PMDA) and oxydianiline (ODA). Prior to use, both chemicals were dried in a vacuum oven at room temperature. Next, 4 g of the monomer ODA was dissolved into 21 g of DMF solution (99.8 wt %). This solution was stored at 5° C. before use. PMDA (4.4 g) was added, and the mixture was stirred for 30 min using a magnetic bar. Subsequently, the clear and viscous polymer solution was separated into four samples. Triethyl amine catalyst (TEA, Sigma Aldrich) with 0, 1, 3, and 5 wt % was then added into each sample to control the molecular weight. Stirring was maintained by a mechanical stirrer until the entire quantity of TEA was added. The as-synthesized PAA was kept at −5° C. to maintain properties essential for further processing.

Solvents utilized in the poly(amic acid) synthesis play a very important role. Common dipolar aprotic amide solvents utilized are DMF, DMAc, NMP and TMU. DMAc was utilized in the present study. The intermediate poly(amic acid) and NGP-PAA precursor composite were converted to the final polyimide by the thermal imidization route. Films were first cast on a glass substrate and then allowed to proceed through a thermal cycle with temperatures ranging from 100° C. to 350° C. The procedure entails heating the poly(amic acid) mixture to 100° C. and holding for one hour, heating from 100° C. to 200° C. and holding for one hour, heating from 200° C. to 300° C. and holding for one hour and slow cooling to room temperature from 300° C.

The PI films, pressed between two alumina plates, were heat-treated under a 3-sccm argon gas flow at 1000° C. This occurred in three steps: from room temperature to 600° C. in 1 h, from 600 to 1,000° C. in 1.3 h, and 1,000° C. maintained for 1 h.

Figure 3:
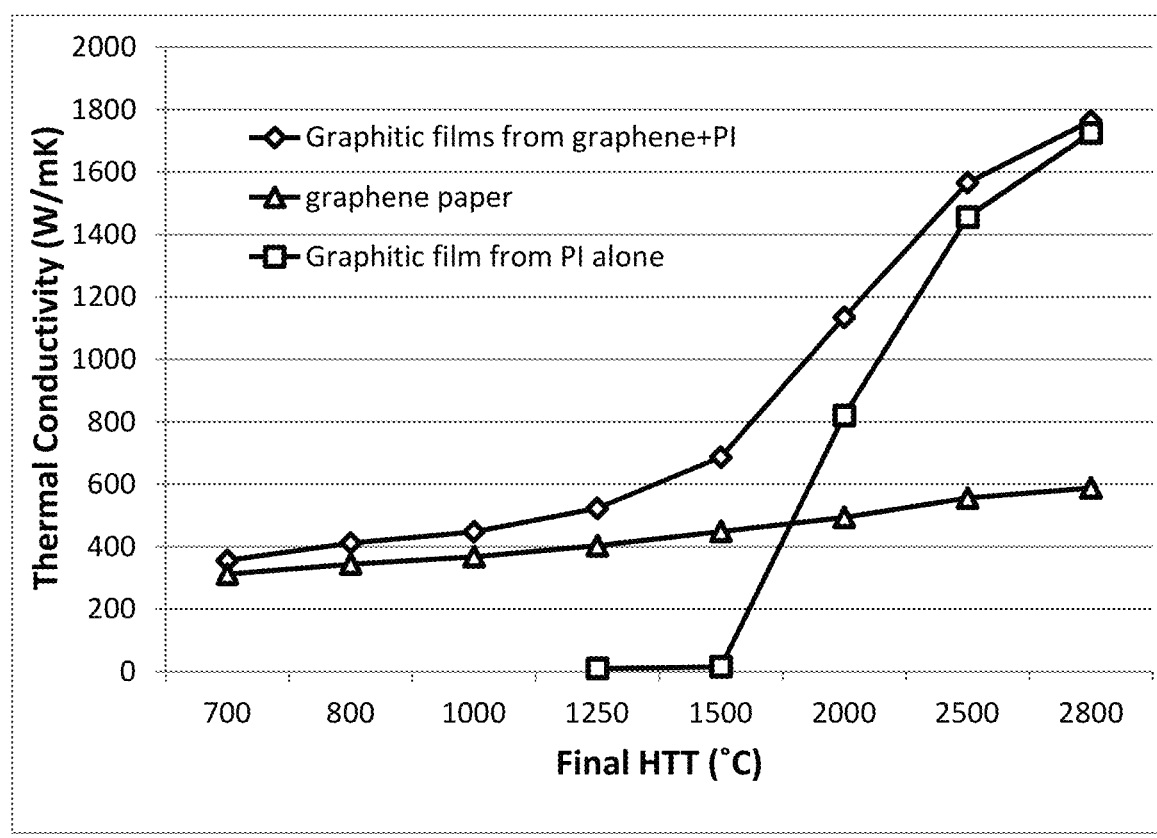
FIG. 3 Thermal conductivity values of a series of graphitic films derived from graphene-PI films (66% graphene+ 34% PI), graphene paper alone, and PI film alone prepared at various final heat treatment temperatures.

The thermal conductivity values of a series of graphitic films derived from graphene-PI films (66% graphene+34% PI), graphene paper alone, and PI film alone each prepared at various final heat treatment temperatures were measured and summarized in FIG. 3.

The invention claimed is:

1. A battery assembly having a distributed cooling and fire protection system, said battery assembly comprising:
   a) a plurality of battery cells;
   b) a case which holds the plurality of battery cells, having empty space around each cell to accommodate a desired amount of a first cooling liquid; and
   c) a cooling liquid distribution system, having a cooling liquid reservoir and/or pipes that are in proximity to at least a subset of the plurality of the cells and configured to deliver, on demand, the desired amount of the first cooling liquid on a cell or multiple cells in the vicinity of the cell or into the empty space surrounding the cell when a temperature of the cell exceeds a threshold temperature; wherein the first cooling liquid comprises a fire protection or fire suppression substance which, on contact with the cell, prevents, retards, or extinguishes a cell fire and prevents a propagation or cell-to-cell cascading reactions of a thermal runaway or fire event, wherein at least one of battery cells comprises at least one heat spreader element disposed partially or entirely inside a protective housing of the cell, wherein the heat spreader element is in thermal communication with the pipes or reservoir and is configured to transport heat away from the battery cells, in the event of a thermal runaway or fire, through the heat spreader element to the pipes or reservoir to activate the delivery of the desired amount of the first cooling liquid via a heat-induced breach or opening of a valve in pipes.

2. The battery assembly of claim 1, wherein the heat-induced breach comprises melting of a breach point in the pipes or reservoir at a temperature corresponding to the threshold temperature of the cell.

3. The battery assembly of claim 1, wherein the opening of a valve in the pipes or reservoir comprises operating a temperature-activated switch or a temperature actuated valve.

4. The battery assembly of claim 1, wherein at least a heat spreader element or a portion of a heat spreader element is in thermal or physical contact with the first cooling liquid which acts to dissipate heat transferred from the battery cell during a normal cell operation.

5. The battery assembly of claim 1, wherein the heat spreader element comprises a high thermal conductivity material having a thermal conductivity from 10 to 1,850 W/mK.

6. The battery assembly of claim 1, wherein the heat spreader element comprises a material selected from a graphene film, flexible graphite sheet, artificial graphite film, Ag, Ag, Cu, Al, brass, steel, Ti, Ni, Mg alloy sheet, silicon nitride, boron nitride, aluminum nitride, boron arsenide, a composite thereof, or a combination thereof.

7. The battery assembly of claim 6, wherein the graphene film contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

8. The battery assembly of claim 1, wherein the heat spreader element is in physical or thermal contact with the anode or the cathode and has a heat-spreading area at least 50% of a surface area of the anode or cathode.

9. The battery assembly of claim 6, wherein said graphene film or artificial graphite film has a thermal conductivity no less than 600 W/mK.

10. The battery assembly of claim 6, wherein said graphene film comprises a graphene material selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

11. The battery assembly of claim 1, wherein the heat spreader element is in a heat-spreading relation to the anode or the cathode and draws heat therefrom during an operation of the battery cells.

12. The battery assembly of claim 1, wherein the heat spreader element has a thickness from about 0.1 μm to about 1 mm.

13. The battery assembly of claim 1, wherein the battery has an anode terminal and a cathode terminal for operating the battery and the heat spreader element is in thermal contact with the anode terminal or the cathode terminal wherein the anode terminal or the cathode terminal is configured to spread heat to the cooling liquid.

14. The battery assembly of claim 1, wherein the heat spreader element is in thermal contact with the protective housing or a cap of the protective housing.

* * * * *